(12) United States Patent
Moreillon

(10) Patent No.: US 8,737,990 B2
(45) Date of Patent: May 27, 2014

(54) METHOD OF LOCAL CONDITIONAL ACCESS FOR MOBILE EQUIPMENT

(75) Inventor: Guy Moreillon, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1184 days.

(21) Appl. No.: 12/375,832

(22) PCT Filed: Jul. 26, 2007

(86) PCT No.: PCT/EP2007/057717
§ 371 (c)(1),
(2), (4) Date: Jan. 30, 2009

(87) PCT Pub. No.: WO2008/015155
PCT Pub. Date: Feb. 7, 2008

(65) Prior Publication Data
US 2009/0325576 A1    Dec. 31, 2009

(30) Foreign Application Priority Data

Aug. 2, 2006  (EP) .................................. 06118345

(51) Int. Cl.
*H04W 4/00*          (2009.01)
(52) U.S. Cl.
USPC ............. 455/434; 455/410; 726/27; 709/238; 380/282
(58) Field of Classification Search
USPC ........... 455/434, 509, 450, 452.2, 554.1, 528, 455/410, 411, 418; 705/1, 51; 709/238; 370/209, 335, 342, 331, 337, 332; 380/282, 255, 200; 726/27
See application file for complete search history.

(56) References Cited

U.S. PATENT DOCUMENTS

| | | | |
|---|---|---|---|
| 5,016,274 A | | 5/1991 | Micali et al. |
| 6,463,276 B1 * | | 10/2002 | Jonsson ........................ 455/410 |
| 6,560,340 B1 | | 5/2003 | Akins, III et al. |

(Continued)

FOREIGN PATENT DOCUMENTS

| | | |
|---|---|---|
| EP | 1 172 270 | 1/2002 |
| EP | 1 645 985 | 4/2006 |

(Continued)

OTHER PUBLICATIONS

International Search Report as cited in PCT/EP2007/057717 dated Feb. 18, 2008.

(Continued)

*Primary Examiner* — Mahendra Patel
(74) *Attorney, Agent, or Firm* — DLA Piper LLP US

(57) ABSTRACT

A method for conditional access to a digital data stream encrypted with at least one control word and broadcasted to at least one mobile device, said transmitter also transmitting a control message stream containing control words and access conditions, said mobile device being connected to a mobile communication network via a mobile access point, comprises: receiving the control message stream by the mobile device; determining a location identifier for the said mobile device by either the identifier of the mobile access point or the identifier of the broadcasting network transmitter; verifying access conditions contained in the control message, said access conditions comprising a reception condition related to a mobile access point identifier and/or an identifier of one broadcasting network transmitter; comparing the determined identifier with the identifier(s) contained in the access conditions; and authorizing or blocking the access to said data stream depending on the result of the comparison.

19 Claims, 2 Drawing Sheets

(56) References Cited

U.S. PATENT DOCUMENTS

| | | | |
|---|---|---|---|
| 6,807,534 B1* | 10/2004 | Erickson | 705/51 |
| 7,066,382 B2* | 6/2006 | Kaplan | 235/375 |
| 7,383,438 B2* | 6/2008 | Fahrny et al. | 713/169 |
| 7,450,930 B2* | 11/2008 | Williams et al. | 455/411 |
| 7,644,266 B2* | 1/2010 | Ahuja et al. | 713/151 |
| 7,676,219 B2* | 3/2010 | Williams et al. | 455/411 |
| 7,703,140 B2* | 4/2010 | Nath et al. | 726/26 |
| 7,748,045 B2* | 6/2010 | Kenrich et al. | 726/27 |
| 7,933,410 B2* | 4/2011 | Fahrny | 380/201 |
| 2002/0051540 A1 | 5/2002 | Glick et al. | |
| 2003/0181160 A1 | 9/2003 | Hirsch | |
| 2004/0101138 A1 | 5/2004 | Revital et al. | |
| 2004/0123150 A1 | 6/2004 | Wright et al. | |
| 2005/0234735 A1* | 10/2005 | Williams | 705/1 |
| 2006/0112188 A1* | 5/2006 | Albanese et al. | 709/238 |
| 2008/0022411 A1* | 1/2008 | Wendling et al. | 726/27 |

FOREIGN PATENT DOCUMENTS

| | | | |
|---|---|---|---|
| WO | WO 99/11086 | 3/1999 | |
| WO | WO 03/067404 | 8/2003 | |
| WO | 2005036820 A1 | 4/2005 | |
| WO | WO 2006/122908 | 11/2006 | |

OTHER PUBLICATIONS

Opposition Filed in EP 2052516 dated Sep. 28, 2012.

Alexander W. Dent et al., "Regional Blackouts: Protection of Broadcast Content on 3G Networks", Fifth International Conference on 3G Mobile Communications Technolgies (Oct. 2004) (5 pages).

RHUL eRepository; Item Summary (Abstract)—Alexander W. Dent et al., "Regional Blackouts: Protection of Broadcast Content on 3G Networks", Fifth International Conference on 3G Mobile Communications Technolgies (Oct. 2004) (5 pages).

Kinji Matsumura et al., "Location-Aware Data Broadcasting—An Application for Digital Mobile Broadcasting in Japan", MM'03, Nov. 2-8, 2003, pp. 271-274.

* cited by examiner

METHOD OF LOCAL CONDITIONAL ACCESS FOR MOBILE EQUIPMENT

TECHNICAL FIELD

The invention concerns the field of conditional access to a digital data stream broadcast by radio link and received by a plurality of mobile devices, such as, for instance, mobile phone, personal digital assistant PDA (Personal Digital Assistant), portable digital television receiver, portable computer.

The broadcast data is encrypted and can be received in clear only by authorized devices, the users of which have purchased the necessary entitlements. These entitlements, stored in a security module associated with the mobile device, consist of a set of keys allowing for the decryption of control words contained in ECM control messages (Entitlement Control Message) broadcast in the audio/video data stream.

A security module is a well-known tamper-proof device containing various encryption/decryption keys, information used to identify a user on a network and data that defines the entitlements purchased by the user for the reception of broadcast content. The security module can exist in different forms such as a removable smart card inserted in a reader, an integrated circuit welded on a motherboard, a memory card (SD or MMC) in which a security chip is embedded, a SIM type card (Subscriber Identity Module) that can be found in most portable devices.

This module can be realised in software form and can be part of the mobile device software. Preferably, this software will run in a particular zone of the memory in order to minimise the interference with other software.

TECHNICAL BACKGROUND

Currently, mobile devices configured for the reception of digital television programmes are based on standard technologies such as OMA (Open Mobile Alliance), DVB-H (Digital Video Broadcast, Handheld), or DMB (Digital Multimedia Broadcasting) which is in a way a broadband extension of DAB (Digital Audio Broadcasting).

The OMA technology implements a single complete solution for a given market such as the portable phone market where all devices and content providers implement the OMA technology.

DVB technology has been designed to standardize digital television decoders (set-top boxes) in order to reduce their costs on a large scale. It standardizes the elements involved in the conditional access to content broadcast in MPEG-2 or MPEG-4 formats for mobile television on the Internet. These elements consist of the encryption algorithm of the broadcast content, the ECM control messages containing the decryption keys or control words, the EMM management messages containing user entitlements and the interface between the decoder and the security module managing the conditional access.

In the particular case of DVB-H mobile television, the protection of the content is developed by the DVB-CBMS group (Digital video Broadcasting—Convergence of Broadcast and Mobile Services).

The standardization does not encompass either the added value content of the ECM and EMM messages, or the method of protection of said messages. Each conditional access provider uses its own data structure and its own protection means for a particular broadcast content. DVB technology thus offers a number of possibilities for the development of content security.

It is well known for a broadcaster to be allowed to manage the reception of an event depending on geographical location. In fact, broadcasters will often try to preclude the access to content such as a sports broadcast in the area surrounding the site where this event takes place. Thus, by knowing the location of each receiver, a so-called <<blackout>> signal is sent to the receiver with for instance the postcode or postcodes of areas which are not allowed to receive live coverage of the event. The security module of the receiver that contains the location information (for example the subscriber postal code to the service or ZIP code), receiving this message, will thus apply a new rule during the entitlements verification and even if the receiver has entitlements for this event, the <<blackout>> message has priority to forbid the access to the event by not sending back the control words that are used to encrypt the event.

Nevertheless, in the mobile universe, this notion of "postal code" is no more valid and it is not possible to restrict a reception on such a portable device.

BRIEF DESCRIPTION OF THE INVENTION

The aim of the present invention is to be able to apply the same restriction means in the mobile world as those applied to fixed receivers.

This aim is achieved using a method for conditional access to a digital data stream encrypted with at least one control word and broadcast via a transmitter in a broadcast network to at least one mobile device, said transmitter also transmitting a control message stream containing the control words and the access conditions, said mobile device being further connected to a mobile communication network via a mobile access point, said method being characterized in that it comprises the following steps:

reception by the mobile device of the control message stream, determination of a location identifier for said mobile device either by the identifier of the mobile access point, or by the identifier of the transmitter in the broadcast network, verification of the access conditions contained in the control message, said access conditions comprising a condition of reception related to at least one mobile access point identifier and/or one transmitter identifier in the broadcast network, comparison between the location identifier and the identifier(s) contained in the access conditions, authorization or blocking of the access to said data stream depending on the result of said comparison.

This method can be used to block the access by a portable device in a certain region (blackout) or otherwise, to authorize the access only in this region (hot spot).

According to this embodiment, the way to determine the location identifier can be based on the mobile cell identifier (mobile access point) or the identifier of the broadcast network transmitter.

In the first case, it seems likely that the precision of the location is more accurate due to the limited range of mobile access points.

In the second case, the broadcasting network comprises a plurality of transmitters that, besides broadcasting the data stream, broadcast service data in which it is possible to identify the transmitter to which the mobile device is tuned.

BRIEF DESCRIPTION OF DRAWINGS

The invention will be better understood thanks to the following detailed description that refers to the annexed figures given as non-limitative examples.

DETAILED DESCRIPTION OF THE INVENTION

A digital data stream forming a content (C) encrypted with control words (CW) is broadcast along with ECM control messages. This digital data can either comprises audio/video television programme data as well as data corresponding to applications being able to be run on a mobile device.

A server of a provider of conditional access content is connected to a broadcasting network (NET1). This network broadcasts through several antennas E1, E2 to mobile devices EM1, EM2. Depending on the location of a mobile device, the latter may connect to antenna E1 rather than to antenna E2.

In the same way, the mobile devices EM1, EM2 are linked to the mobile telecommunication network NET2 by appropriate antennas F1, F2.

The mobile device can define its geographical position either by the broadcasting antenna network E1, E2 or by the mobile telecommunication antennas F1, F2. In the communication protocol of both communication systems, the antenna identifier is transmitted to the mobile device and is thus used as a location identifier. This identifier is used for instance for measuring the reception quality of a network.

This identifier as such does not necessarily give a geographical indication and can be a simple alphanumeric value.

At the same time, the broadcasting transmitter sends a control message stream with the audio/video data stream. The control message contains the control word(s) used to decrypt the encrypted content and further contains the access conditions to this content.

According to the invention, the access conditions comprise, in addition to the entitlements necessary for the reception of the content (for instance subscription), one or more of the antenna identifiers related to the zones where reception is either restricted or authorized. These identifiers can be related to the broadcast network NET1 or related to the mobile telecommunication network NET2. It is also possible to include a joint list comprising one or various identifiers of both networks in the access conditions.

Figure 1:
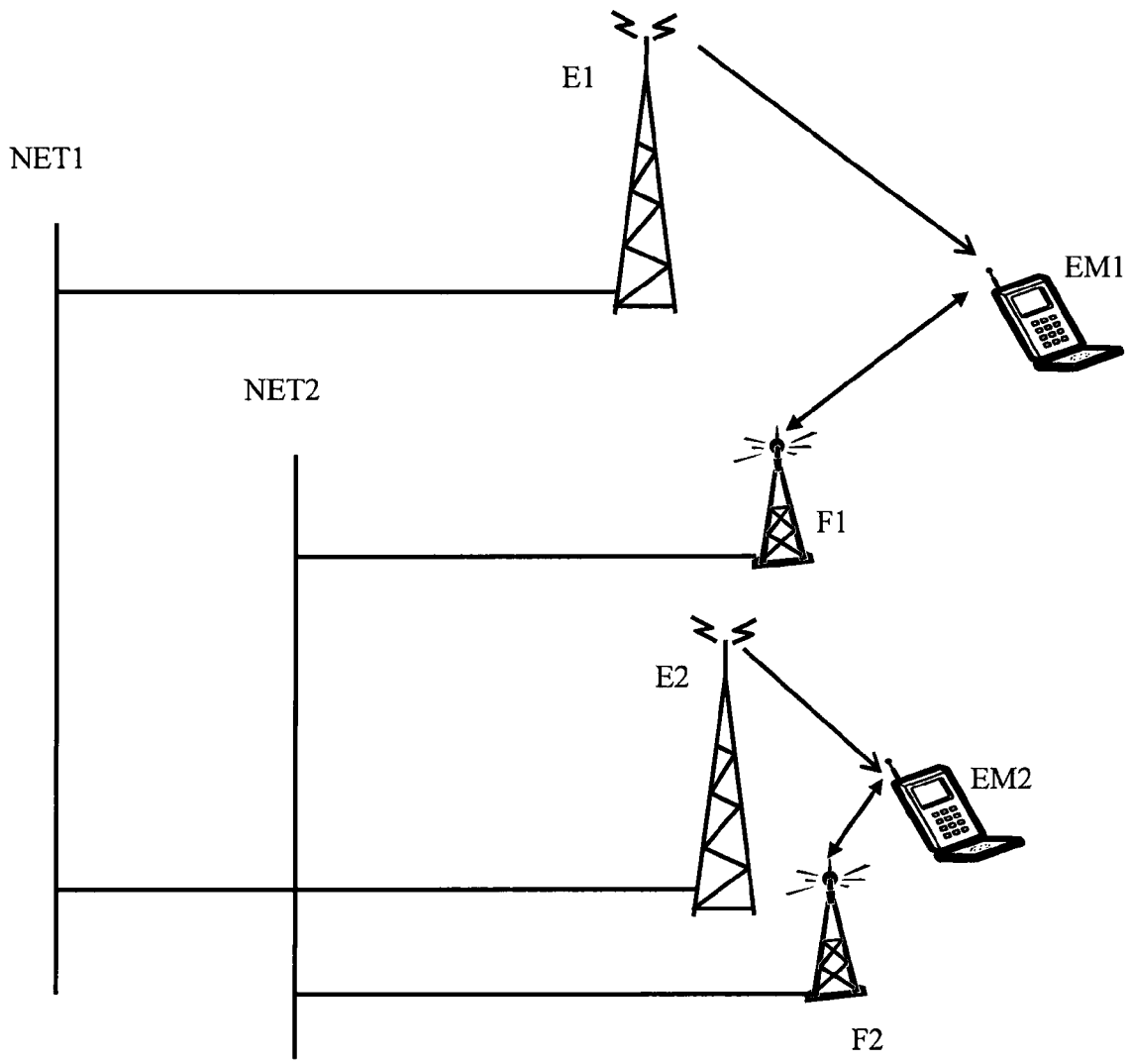
FIG. 1 shows a block-diagram of an example of the configuration with two transmitters placed in different locations and being within receiving distance of a local mobile device.
Figure 2:
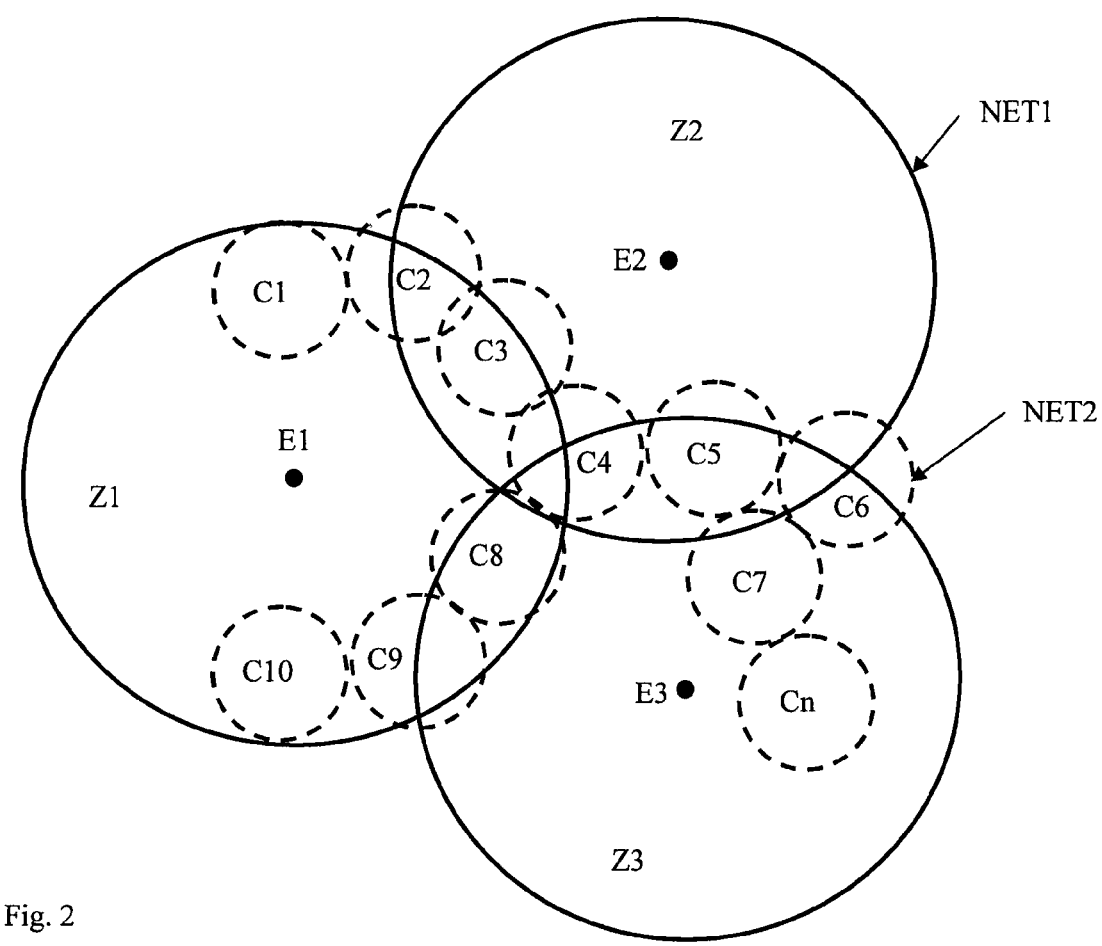
FIG. 2 shows a schematic example of the coverage of the broadcasting network transmitters and of the mobile network cells inside these broadcasting areas.

As it can be seen in FIG. 2, it is preferable to use the identifiers C1 to Cn of the mobile telecommunications network. The coverage for each cell is smaller, which allows a better demarcation of the restricted area. Nevertheless in some circumstances, for instance for blocking or authorizing the access in an entire city, it is simpler to do this by the identifiers of some broadcasting transmitters of the city.

When a control message arrives on the mobile device, this message is transmitted to the device's security means. These means can either be the SIM card of the mobile device, or a specialized circuit (directly soldered onto the printed circuit), or can be realised in software form. These security means verify whether or not the access conditions specified in the control message are met. These conditions can have several forms, such as an entitlement specific to the content, a general entitlement for a given channel or a payment system per time as described in the application WO03/085959.

According to the invention, in addition to conditions such as those described previously, and as far as the content reception is limited according to the geographical location, the security means verify whether or not the obtained location identifier of the broadcasting or telecommunication antenna is present in the identifier list comprised in the control message. If the location identifier is included in the list of the identifier(s) broadcast in the access conditions, the security means will be able to send either the control word to the decryption means (hot spot version) or otherwise block the broadcasting of the control word to the decryption means (blackout).

It should be noted that the control message is encrypted in such a way that a third party cannot access the identifiers used to restrict the access to audio/video data. According to a particular mode of the invention, the location identifier can be signed in order to guarantee its integrity. The broadcasting centre (or telecommunication centre according to the embodiment) uses its private key (from a pair of asymmetrical keys) to sign the identifier. This signature is realized in a conventional way, for instance by using a hashing method (Hash) of the identifier and an encryption of the result by the private key.

On the reception side, the security module has the corresponding public key, which allows it to decrypt the signature in order to obtain the presumed Hash value and compare this value with the one calculated by the security module on the location identifier (authentication). The comparison of the presumed value and the calculated value allows, if they are equal, to ensure that the identifier has not been modified.

In a particular embodiment, the security module is pre-initialized by a default location value. The current identifier replaces this value as soon as it is communicated to the security module.

When a control message arrives at the said module, and given that it contains a blackout control, the default value is considered as being automatically part of the location identifiers that have to be blacklisted.

According to an embodiment it is possible to define a duration during which an identifier is valid. Once this validity is expired, and if a more recent identifier has not been transmitted to the security module, the default identifier is re-established and is thus considered active at each blackout command. This duration can either be a parameter of the security module, or be associated with the identifier data, for instance with the authentication signature. In order to avoid an identifier being reused, a current date is associated with the identifier, preferably authenticated with the identifier itself. Thus, an identifier previously harvested in another network cell will not be able to be reutilized in another mobile device. In order to reinforce the whole security, the security module will refuse all identifiers associated with a date previous to that of the identifier transmitted previously.

In addition to the well-known telecommunication networks such as GSM, GPRS or UMTS, other location means can be used such as for instance Wifi, WiMax, Wibro, or any network having a set of antennas. The location precision will directly depend on the antennas' density. It should be noted that the identifier contained in the control message could include an identifier range. For instance if the antennas identifiers in a city all begin with ABC (ABCV120, ABCJ11 etc), it is possible to only send the prefix ABC for including all the antennas ABCxxx. Others possibilities can include a range such as ABC100 to ABC200.

The invention claimed is:

1. A method for conditional access to a digital data stream encrypted with at least one control word and broadcast via a plurality of transmitters in a broadcast network to at least one mobile device in communication with a transmitter among the plurality of transmitters, said method comprising:

receiving a control message stream by the mobile device, the control message stream comprising control words and access conditions, the access conditions including at least one location identifier;

receiving a current location identifier by the mobile device, the current location identifier being transmitted by and identifying the transmitter;

performing by the mobile device a comparison of the current location identifier with the location identifier contained in the access conditions; and authorizing or blocking the access to said data stream by the mobile device depending on the result of said comparison;

wherein the control word comprises a key for decrypting the encrypted digital data stream, the control word being received in encrypted form; and wherein the access conditions further comprise at least one entitlement description related to the broadcasted content and wherein the authorization or blocking of the access further depends on the presence of the at least one entitlement description.

2. The method according to claim 1, wherein the access to said data stream is authorized only if the access conditions comprise the current location identifier.

3. The method according to claim 1, wherein the access to said data stream is only authorized if the access conditions do not comprise the current location identifier.

4. The method according to claim 1, wherein the current location identifier is an identifier of a mobile access point and is extracted from the service data received from said mobile access point.

5. The method according to claim 1, wherein the current location identifier is an identifier of a broadcasting network and is extracted from the service data received from said broadcasting network transmitter.

6. The method according to claim 1, wherein the access conditions comprise a list of location identifiers from the broadcasting network.

7. The method according to claim 1, wherein the access conditions comprise a list of mobile access point identifiers.

8. The method according to claim 1, wherein the mobile device comprises a security module responsible for the treatment of the access conditions.

9. The method according to claim 1, wherein the mobile communication network is selected according to one of the GSM, GPRS, UMTS, WiMax, Wifi, Wibro types.

10. The method according to claim 1, wherein the location identifier contained in the access conditions defines a range of the location identifiers.

11. The method according to claim 1, wherein the current location identifier is signed, and wherein the mobile device verifies an identifier signature before the comparison with the identifier(s) contained in the access conditions.

12. The method according to claim 1, wherein the mobile device comprises a default identifier considered as a part of the identifier contained in the access conditions, causing the blocking of the access to said data stream if no further identifier has been introduced.

13. The method according to claim 12, wherein a duration is associated to the reception of an identifier by the mobile device, the default identifier being re-established after the expiration of the duration.

14. The method according to claim 1, wherein the current location identifier uniquely identifies the mobile access point or the broadcasting network transmitter.

15. A mobile device for providing conditional access to a digital data stream encrypted with at least one control word and broadcast via a plurality of transmitters in a broadcast network to at least one mobile device in communication with a transmitter among the plurality of transmitters, the mobile device comprising:
a wireless receiver; and
a security module;
wherein the security module is configured to perform the steps of
receiving a control message stream, the control message stream comprising control words and access conditions, the access conditions including at least one location identifier;
receiving a current location identifier, the current location identifier being transmitted by and identifying the transmitter;
performing a comparison of the current location identifier with the location identifier contained in the access conditions; and
authorizing or blocking the access to said data stream depending on the result of said comparison;
wherein the control word comprises a key for decrypting the encrypted digital data stream, the control word being received in encrypted form; and
wherein the access conditions further comprise at least one entitlement description related to the broadcasted content and wherein the authorization or blocking of the access further depends on the presence of the at least one entitlement description.

16. The mobile device according to claim 15, wherein the access to said data stream is authorized only if the access conditions comprise the current location identifier.

17. The mobile device according to claim 15, wherein the access to said data stream is only authorized if the access conditions do not comprise the current location identifier.

18. The mobile device according to claim 15, wherein the current location identifier is an identifier of a mobile access point and is extracted from the service data received from said mobile access point.

19. The mobile device according to claim 15, wherein the current location identifier is an identifier of the broadcasting network and is extracted from the service data received from said broadcasting network transmitter.

* * * * *